United States Patent
Eakin et al.

(10) Patent No.: US 10,677,319 B2
(45) Date of Patent: Jun. 9, 2020

(54) GEAR DRIVE FOR AIR DRIVEN VEHICLES

(71) Applicant: Century Drive Systems, Franklin, PA (US)

(72) Inventors: Shawn Michael Eakin, Franklin, PA (US); Robert Charles Eakin, Franklin, PA (US)

(73) Assignee: Century Drive Systems, Franklin, PA (US)

( * ) Notice: Subject to any disclaimer, the term of this patent is extended or adjusted under 35 U.S.C. 154(b) by 30 days.

(21) Appl. No.: 15/799,828

(22) Filed: Oct. 31, 2017

(65) Prior Publication Data

US 2019/0128378 A1 May 2, 2019

Related U.S. Application Data

(60) Provisional application No. 62/415,193, filed on Oct. 31, 2016.

(51) Int. Cl.

| *F16H 1/20* | (2006.01) |
|---|---|
| *F16D 3/12* | (2006.01) |
| *B63H 23/02* | (2006.01) |
| *B63H 7/02* | (2006.01) |
| *B63H 23/06* | (2006.01) |
| *B63H 23/34* | (2006.01) |
| *F16H 57/04* | (2010.01) |
| *F16F 15/124* | (2006.01) |

(52) U.S. Cl.
CPC .............. *F16H 1/20* (2013.01); *B63H 7/02* (2013.01); *B63H 23/06* (2013.01); *B63H 23/34* (2013.01); *F16D 3/12* (2013.01); *F16F 15/124* (2013.01); *F16H 57/046* (2013.01)

(58) Field of Classification Search
CPC ... F16H 1/06; F16H 1/206; F16H 1/20; F16H 57/0427; F16H 57/0431; F16H 57/0434; F16H 57/046; B63H 7/02; B63H 23/06; B63H 23/34; F16D 3/12; F16F 15/1216; F16F 15/124

See application file for complete search history.

(56) References Cited

U.S. PATENT DOCUMENTS

| 3,590,652 | A | * | 7/1971 | Strang | F16C 35/073 74/421 R |
|---|---|---|---|---|---|
| 3,926,073 | A | * | 12/1975 | Roche | F16H 57/10 475/148 |
| 4,148,227 | A | * | 4/1979 | Neugebauer | F16H 57/0498 74/409 |
| 4,255,981 | A | * | 3/1981 | Sigg | B63H 23/08 74/665 A |

(Continued)

FOREIGN PATENT DOCUMENTS

| DE | 10020434 A1 | * | 10/2001 | ............. B63H 23/06 |
|---|---|---|---|---|
| GB | 1310472 A | * | 3/1973 | ............... B63H 3/00 |
| JP | 05346141 A | * | 12/1993 | ........... F16H 57/021 |

*Primary Examiner* — Adam D Rogers
(74) *Attorney, Agent, or Firm* — Paul D. Bangor, Jr., Esquire; Clark Hill PLC

(57) ABSTRACT

A transmission (14) for connecting a propeller (15) to an engine (13) having a drive shaft (2), comprising: a first gear (3) driven by the drive shaft (2) in a first rotational direction; an idler gear (4) driven by the first gear; a third gear (5) driven by the idler gear (4); and an output shaft (6) driven by the third gear in the first rotational direction.

9 Claims, 7 Drawing Sheets

(56) References Cited

U.S. PATENT DOCUMENTS

| | | | |
|---|---|---|---|
| 4,530,667 A | | 7/1985 | McCormick |
| 4,829,850 A | | 5/1989 | Soloy |
| 4,884,949 A | | 12/1989 | Eakin |
| 5,085,603 A | | 2/1992 | Haluzak |
| 5,249,666 A | * | 10/1993 | Gorski .................. F16D 41/064 188/82.84 |
| 5,807,149 A | | 9/1998 | Kaye |
| 5,839,926 A | | 11/1998 | Kaye |
| D403,004 S | | 12/1998 | Kaye |
| 6,478,641 B2 | * | 11/2002 | Jordan .................. B63H 23/06 440/75 |
| 6,508,713 B1 | | 1/2003 | Kaye |
| 6,540,570 B1 | | 4/2003 | Eakin |
| 7,335,074 B2 | | 2/2008 | Arneson |
| 8,225,690 B2 | * | 7/2012 | Shimada .................. F16H 1/20 74/443 |
| 8,365,622 B2 | * | 2/2013 | Gadre ..................... F16H 3/006 74/330 |
| 9,347,500 B2 | * | 5/2016 | Okuda ..................... B60K 6/48 |
| 10,315,747 B1 | * | 6/2019 | Jaszewski ............... B63H 20/20 |
| 2007/0010144 A1 | | 1/2007 | Arneson |
| 2007/0131464 A1 | * | 6/2007 | Hwang .................. B60K 6/365 180/65.21 |
| 2007/0204712 A1 | * | 9/2007 | Mineshima ............... F16H 1/20 74/413 |
| 2009/0218171 A1 | * | 9/2009 | Nicot ....................... F01M 9/02 184/55.1 |
| 2015/0209622 A1 | | 7/2015 | Guinyard |

* cited by examiner

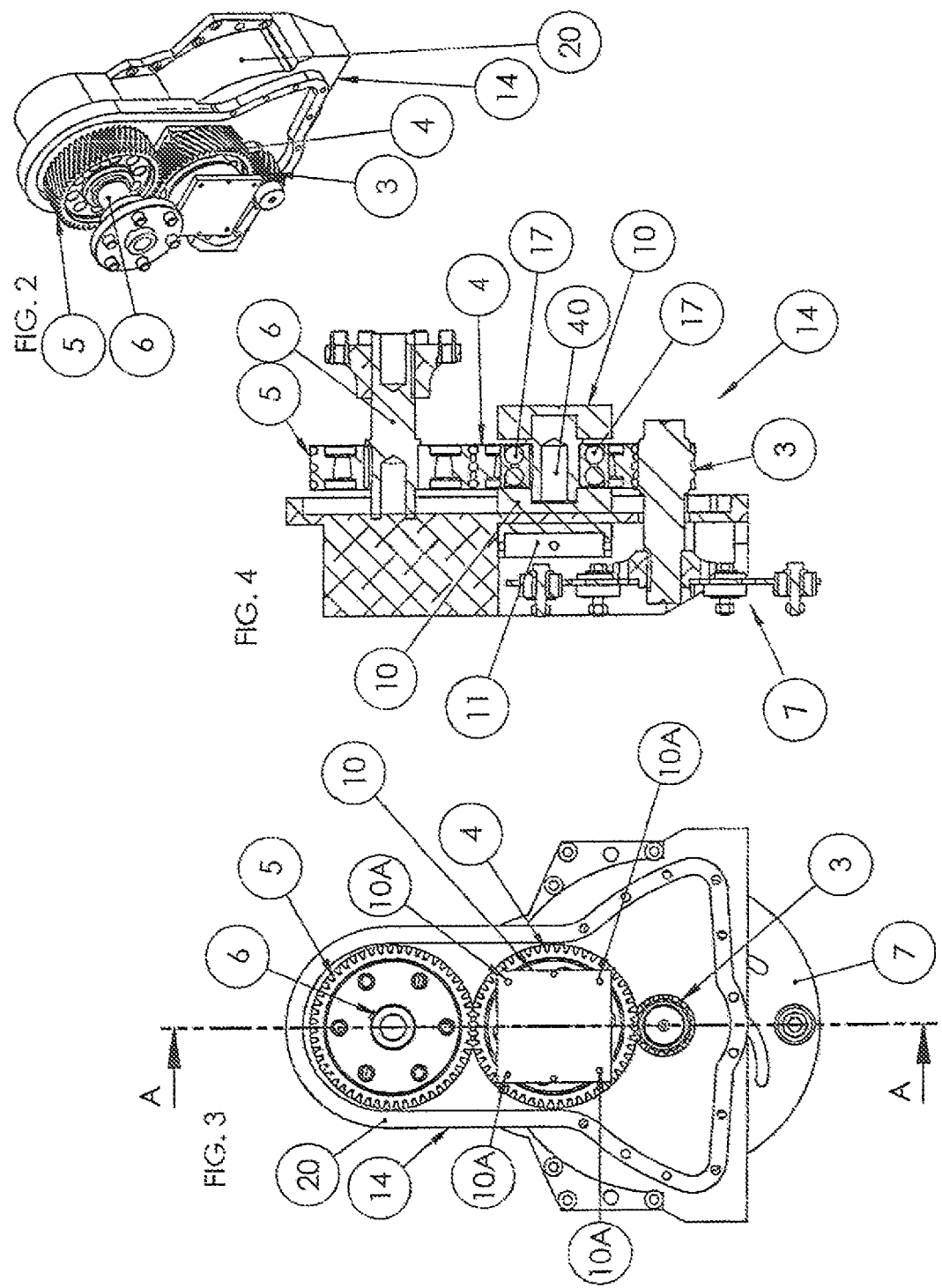

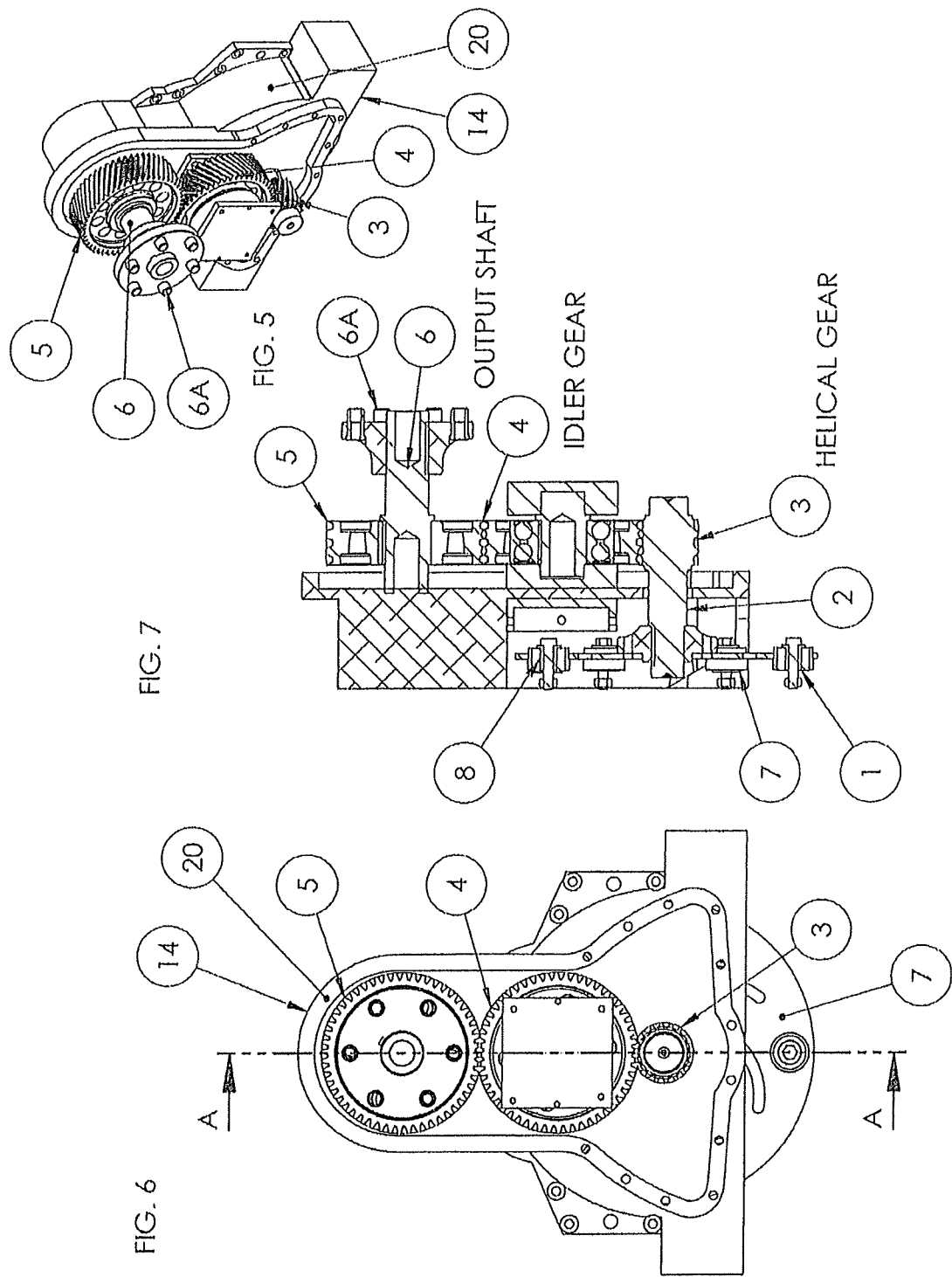

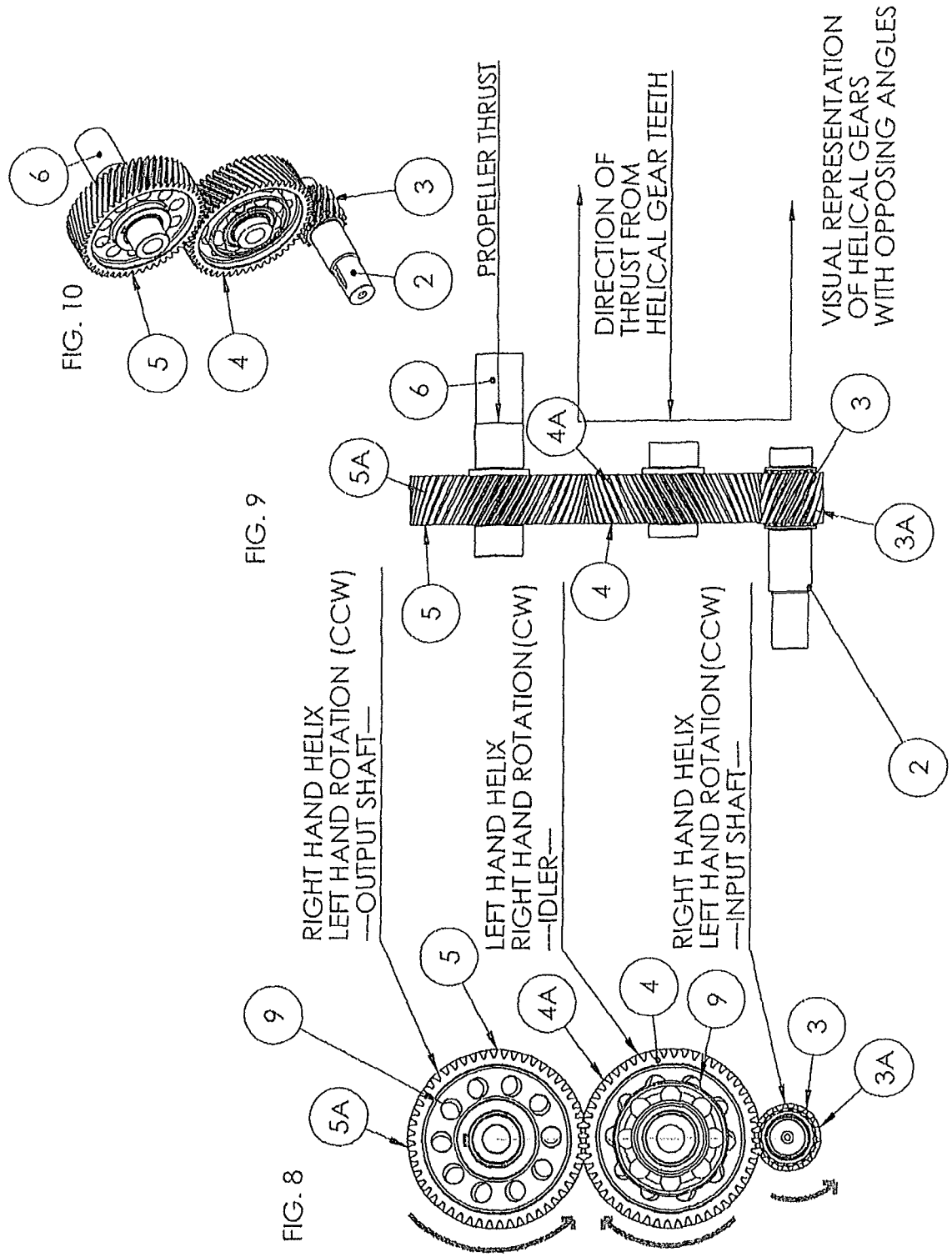

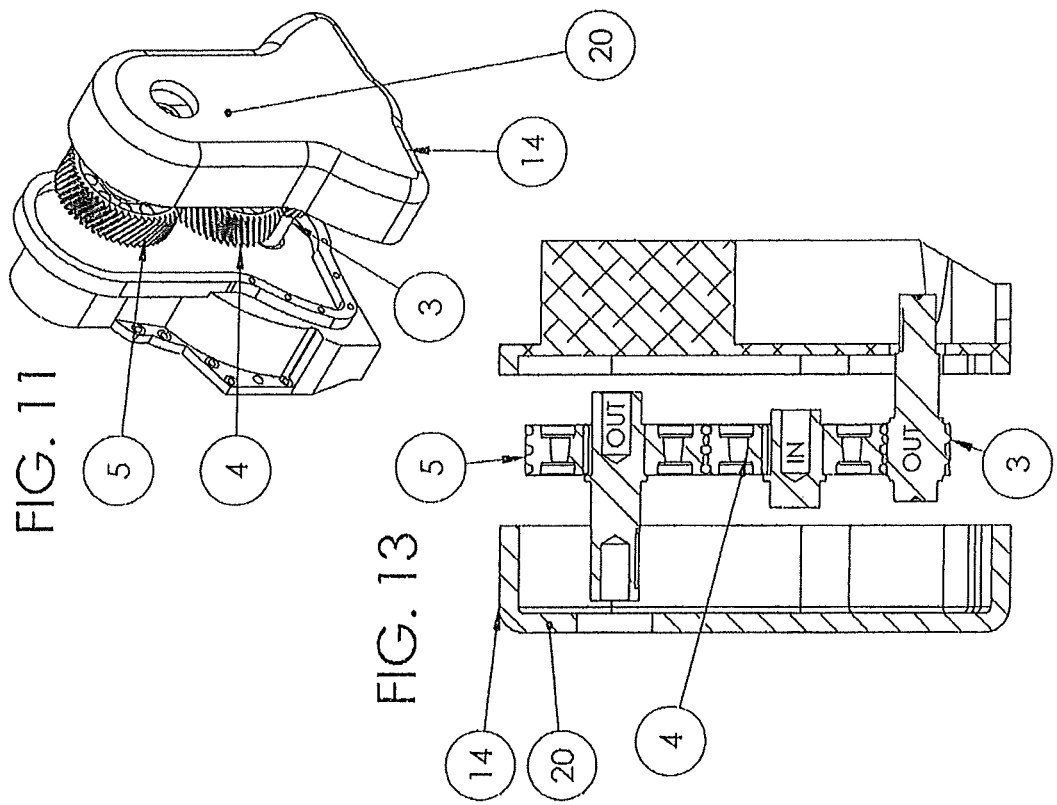
FIG. 11
FIG. 13
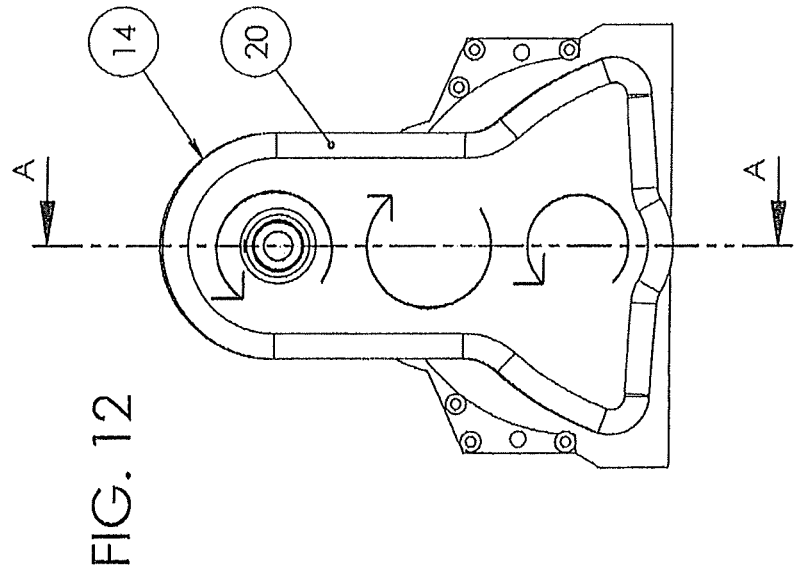
FIG. 12

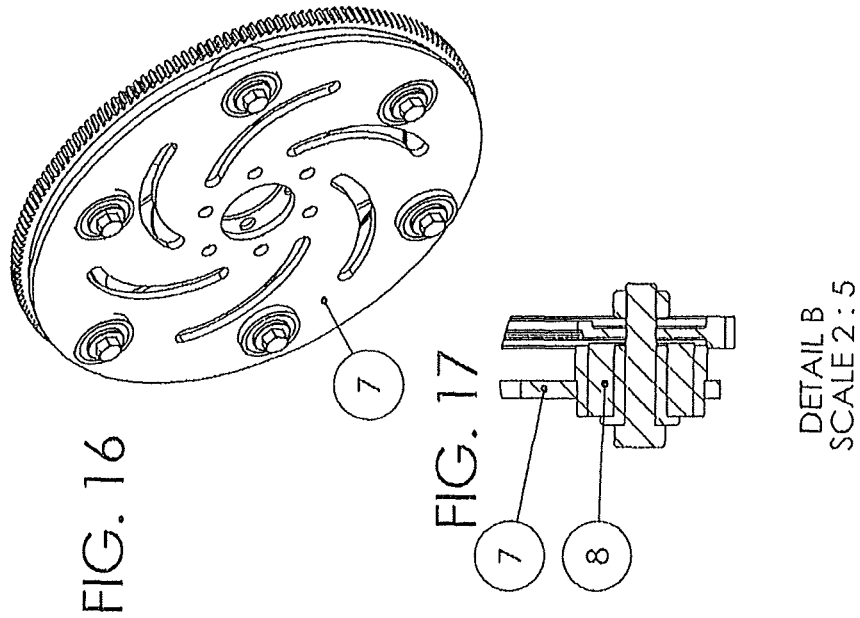
FIG. 16
FIG. 17
DETAIL B
SCALE 2 : 5
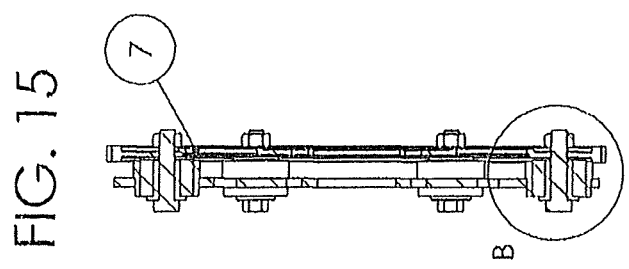
FIG. 15
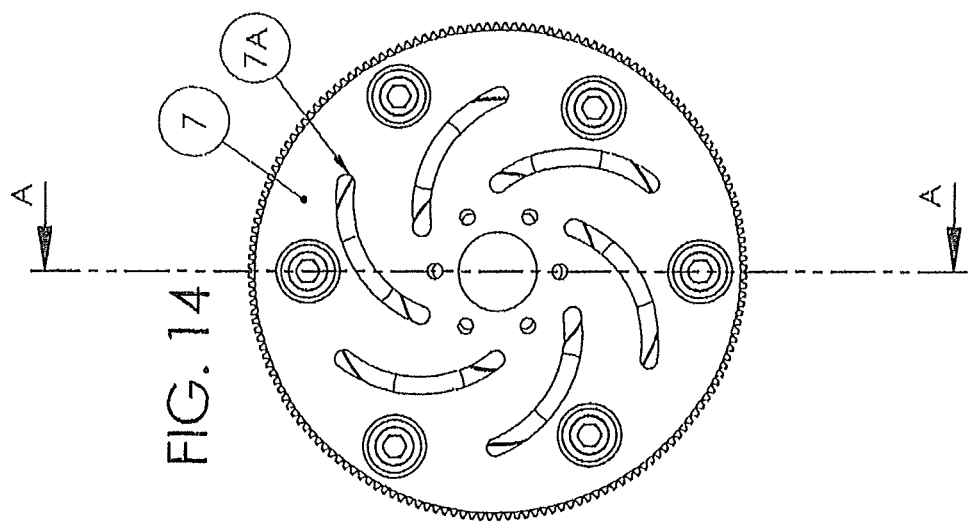
FIG. 14

GEAR DRIVE FOR AIR DRIVEN VEHICLES

This application claims the benefit of provisional patent application U.S. Ser. No. 62/415,193 filed Oct. 31, 2016, which is incorporated by reference herein for all purposes.

FIELD OF THE DISCLOSURE

The present disclosure is related to drive mechanisms for air driven vehicles.

BACKGROUND OF THE DISCLOSURE

Air driven vehicles, such as airboats, are often driven over land and water at high speeds. Airboats typically may employ aircraft engines operating at approximately 2500-3000 revolutions per minute (rpm) or car engines generally operating at higher rpms.

Extreme gyroscopic forces can occur when airboats are turned rapidly, and these forces are borne, among other structures, by the drive units of air driven vehicles.

The use of a gear-based transmission for airboats is known generally in the art. However, numerous disadvantages hamper existing gear-based transmissions for air driven vehicles.

Thus, it would be desirable to have a transmission for an air driven vehicle that uses a reverse helical gear configuration in a manner to help neutralize the thrust produced by the propeller to balance the torque of the power source and the weight of an operator of the air driven vehicle. It would also be desirable to have a transmission for an air driven vehicle that extends bearing life of the gear bearings with an output gear rotating in the same direction as the motor drive shaft.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a transmission (14) for connecting a propeller (15) to an engine (13) having a drive shaft (2), comprising: a first gear (3) driven by the drive shaft (2) in a first rotational direction; an idler gear (4) driven by the first gear; a third gear (5) driven by the idler gear (4); and an output shaft (6) driven by the third gear in the first rotational direction.

In another aspect of a preferred transmission of the present disclosure, the first rotational direction is counter-clockwise from a perspective of behind and facing the stern of a vehicle driven by the propeller.

In yet another aspect of a preferred transmission of the present disclosure, the first gear (3), idler gear (4) and third gear (5) are helical gears.

In another aspect of a preferred transmission of the present disclosure, respective helix angles of gear teeth (3A), (4A) and (5A) on each of the first gear (3), idler gear (4) and third gear (5) operate when driven by the engine (13) and drive shaft (2) to produce thrust on the output shaft (6) that opposes thrust produced by the propeller (15) on the output shaft (6).

In a further aspect of a preferred transmission of the present disclosure, the respective helix angles of gear teeth (3A), (4A) and (5A) on each of the first gear (3), idler gear (4) and third gear (5) are right-handed or left-handed.

In another aspect of a preferred transmission of the present disclosure, the transmission (14) includes input and output connection points and multiple rolling contact carriers.

In yet another aspect of a preferred transmission of the present disclosure, the transmission (14) uses a reverse helical gear configuration in a manner to help neutralize thrust produced by the propeller (15).

In another aspect, the transmission (14) further comprises a torsion dampening plate (7) disposed on the drive shaft (2) within a housing (20) of the transmission (14).

In yet another aspect, the transmission (14) further comprises a torsion dampening plate (7) disposed on the drive shaft (2) within a housing (20) of the transmission (14) wherein the torsion dampening plate (7) dampens torque from the engine (13).

In an additional aspect, the transmission (14) further comprises a torsion dampening plate (7) disposed on the drive shaft (2) within a housing (20) of the transmission (14) wherein the torsion dampening plate (7) dampens torque from the engine (13) and wherein the plate (7) defines a plurality of mounting openings (7C) and further comprises a plurality of bushings (8) to further assist in dampening any vibrations, shock loads, noises or stresses caused by torque from the engine (13).

In another aspect of a preferred transmission of the present disclosure, one or more of the first gear (3), idler gear (4) and third gear (5) define angular holes (9) in an angular fashion opposite to each respective angle of helix teeth (3A), (4A) and (5A) to increase oil flow and assist in cooling through the movement of mist of oil and air on an inside of a housing (20) for the transmission (14).

In yet another aspect, the transmission (14) further comprises an oil pump (11) to assist in oil flow within a housing (20) for the transmission (14), wherein oil pump (11) is selected from the group consisting of a mechanical pump, an electrical pump, or any combination thereof.

In another aspect, the transmission (14) further comprises a carrier assembly (10) that allows idler gear (4), idler shaft (40) and idler bearings (17) to be mounted in variable positions, via fasteners and holes (10A), in the transmission housing (20) to allow the same housing (20) to be used for multiple gear sets having varying ratios of reduction.

In another aspect of a preferred transmission of the present disclosure, the thrust produced in the idler gear (4) is opposed by thrust from the first gear (3) and the third gear (5).

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein:

FIG. 2 is a top perspective view of a preferred transmission of the present disclosure for an air driven vehicle;

FIG. 3 is a cross-sectional view of a preferred transmission of the present disclosure for an air driven vehicle;

FIG. 4 is a sectional view of the transmission along line A-A of FIG. 3;

FIG. 5 is a top perspective view of a preferred transmission of the present disclosure for an air driven vehicle;

FIG. 6 is a cross-sectional view of a preferred transmission of the present disclosure for an air driven vehicle;

FIG. 7 is a sectional view of the transmission along line A-A of FIG. 6;

FIG. 8 is a schematic front view of a preferred set of helical gears for a preferred transmission of the present disclosure for an air driven vehicle;

FIG. 9 is a schematic side view of the preferred set of helical gears of FIG. 8 for a preferred transmission of the present disclosure for an air driven vehicle;

FIG. 10 is a top perspective view of the preferred set of helical gears of FIG. 8 for a preferred transmission of the present disclosure for an air driven vehicle;

FIG. 11 is a top perspective and exploded view of a preferred transmission of the present disclosure for an air driven vehicle;

FIG. 12 is a rear elevational view of a preferred transmission of the present disclosure for an air driven vehicle;

FIG. 13 is a cross-sectional and exploded view of the preferred transmission along line A-A of FIG. 12;

FIG. 14 is an elevational view of a flexible plate for a preferred transmission of the present disclosure for an air driven vehicle;

FIG. 15 is a cross-sectional view along line A-A of the plate of FIG. 14;

FIG. 16 is a top perspective view of the plate of FIG. 14;

FIG. 17 is a magnified view of area B of the cross-section of the plate from FIG. 15.

DETAILED DESCRIPTION

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, hydraulic, mechanical and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

Figure 1:
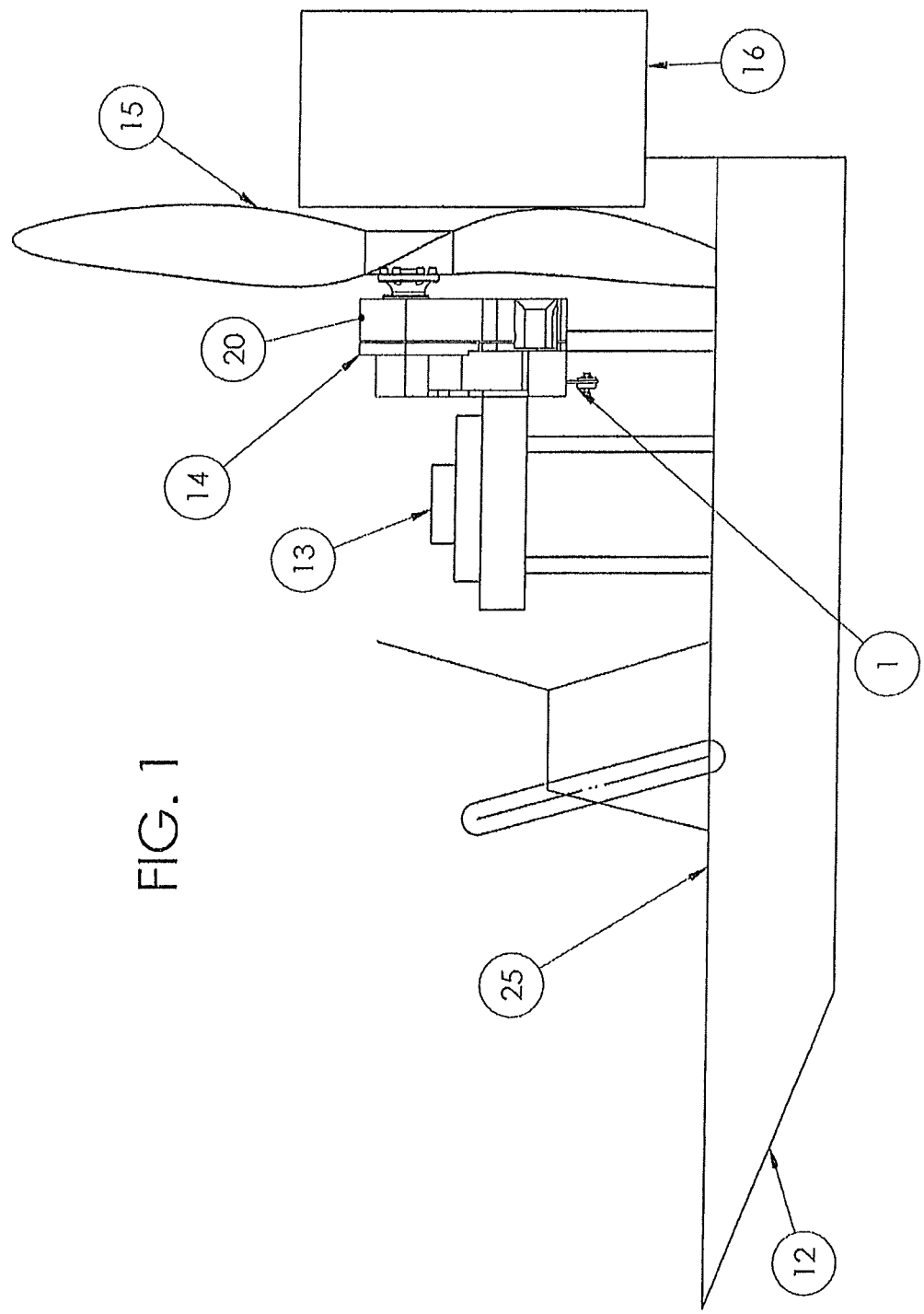
FIG. 1 shows a schematic view of an air driven vehicle according to the present disclosure.
Figure 18:
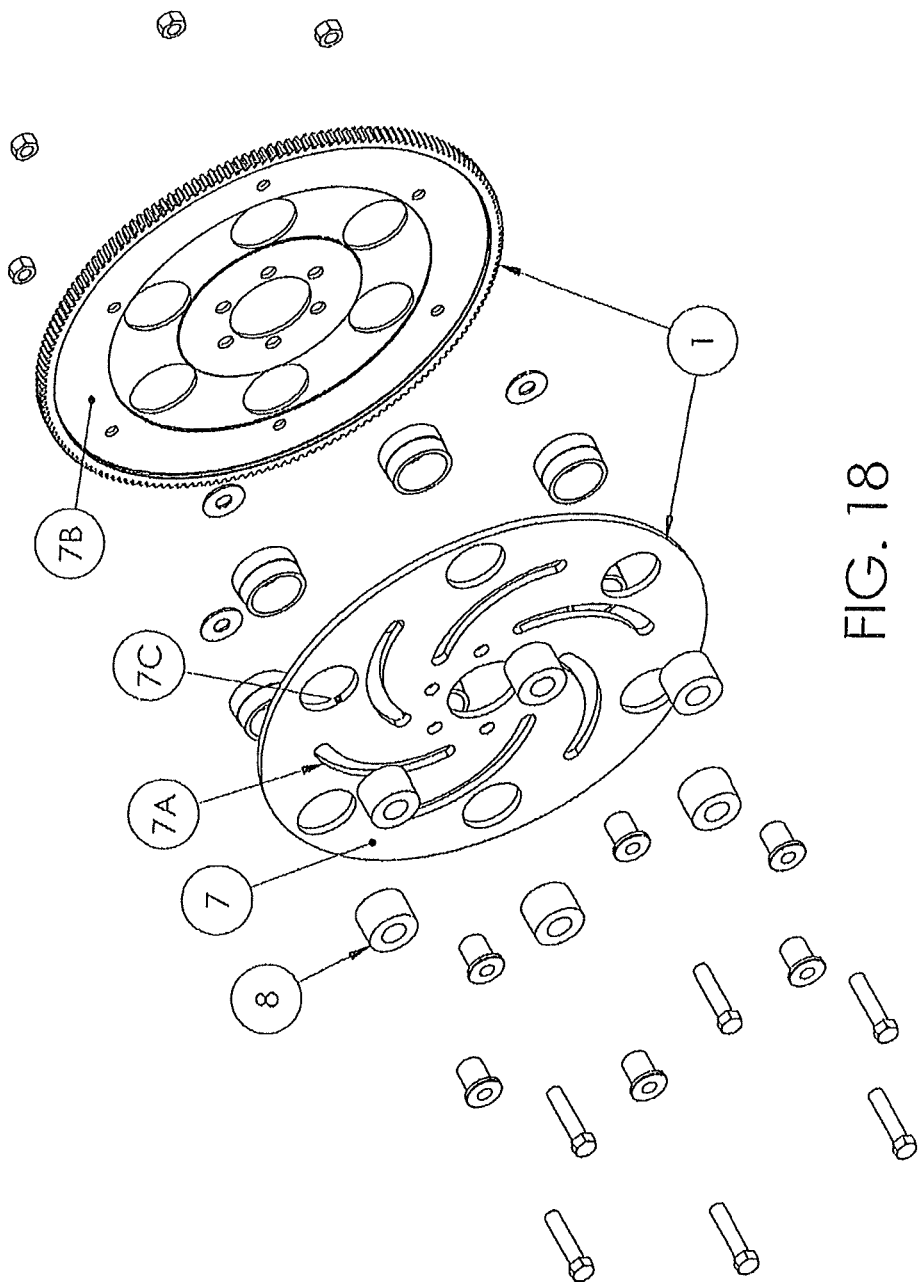
FIG. 18 is an exploded view of the flexible plate of FIG. 14.

As shown in FIGS. 1-18, a preferred reduction transmission 14 of the present disclosure provides the same rotation direction of the output driven mechanism (6) as the drive shaft (2).

Specifically a left hand rotation of a propeller/propellers for an airboat (See FIG. 1) for the purposes of providing propulsion to the vehicle and making a more stable operating airboat.

A transmission for use with an input shaft from a power source at the lower end of the bellhousing case. Transmission will transmit power and torque through a series of helical gears to the propeller which will have the same final rotational direction as the power source.

A drive gear (3) is carried and driven by a primary shaft (2), the drive gear (3) drives an idler gear (4), which in turn drives the final output gear (5). The final output gear (5) will be carried by and drive a final shaft (6) with connection points (6A) allowing a propeller (15) to be attached. Propeller (15) will be the final driven mechanism providing thrust for the machine propulsion (such as an airboat (25)). The gears (3), (4) and (5) will be encapsulated in a bell-shaped gear case (20) with multiple connection points and rolling elements. The bell-shaped gear case will be attached to or integral with the bellhousing case that houses torsion dampening connection plate (7). The assembly comprising reduction transmission 14 and torsion dampening connection plate (7) in bellhousing (20) is attached to power source (13) via the bellhousing (20) and input shaft (2). Output shaft (6) is attached to driven mechanism such as an airboat propeller (15).

One aspect of a preferred embodiment of the present disclosure comprises an airboat (25), comprising: a hull (12); an engine (13) carried by the hull, the engine having a driving connection point (1); a primary driven shaft (2) carrying a primary helical gear (3); an idler gear(s) (4) driven by the primary gear; a final gear (5) driven by the idler gear(s) and an output shaft (6) driven by the final gear (5) rotating in the same rotational direction as the primary gear (3) and the input power source (13); and a rudder (16) carried by the hull.

In another aspect of a preferred airboat (25) of the present disclosure, the reduction transmission (14) carries/includes primary driver gear (3), one or more idler gears (4), driven gear (5), input and output connection points and multiple rolling contact carriers.

In a further aspect of a preferred airboat of the present disclosure, the transmission uses a reverse helical gear configuration in a manner to help neutralize the thrust produced by the propeller (15), thus extending bearing life of the gear bearings (17) while rotating in the same direction (left hand) as the drive shaft (2). "Left hand rotation" as used herein means counter-clockwise from a perspective of behind and facing the stern of a vehicle driven by the propeller. Preferably in this particular configuration, the driver (3) drives the idler (4), idler (4) drives the driven (5) and the driver (3) and driven (5) are 180 degrees apart. In this configuration, the axial thrust forces of idler (4) cancel each other. Driver (3) and driven gear (5) will be exactly 180 degrees apart therefor also cancelling the separating forces of idler (4). In this preferred configuration, the tangential loads will be additive such that for an idler gear (4) mounted on an internal bearing, the only radial load the bearing will experience is 2× the tangential tooth load since they are additive, but the other forces oppose each other and net to zero. This is in the configuration as presented where driver (3), idler (4) and driven gear (5) are all in a straight line.

In the case that the helix angle is not reversed, it will cause forces in addition to the thrust of the propeller (15), the thrust caused by both propeller (15) and helix gear pressure preferably is compensated for via bearing modifications.

Helical gears (3), (4) and (5) of the transmission (14) can be of left or right hand helix angles and still achieve left hand rotation same as the power source. The only difference will be in the type or style of bearings needed to contend with thrust produced.

Angles of the helical gears (3), (4) and (5) will be configured on best case scenario to be self-sufficient and provide input and output performance as well as bearing longevity in multiple positions of the gear or gears.

In another aspect of a preferred airboat (25) of the present disclosure, the propeller (15) turns in the same direction as the drive shaft (2) input power rotation (preferably left handed for an airboat with the steering lever on left side) will assist to balance the torque of the power source (13) and the weight of a left side operator.

In an additional aspect of a preferred airboat (25) of the present disclosure, the input connection point (1) of the power source (13) to the transmission (14) will be via a machined spring aluminum plate (7). The plate (7) will be machined in a fashion to help absorb torque from input power source (13). The plate (7) will also contain a plurality, (preferably six) cladded, medium durometer bushings (8) disposed in mounting openings (7C) to further assist in dampening any vibrations, noises, shock loads or stresses caused by torque from power source 13. In addition, plate (7) may also have slots (7A) to provide added flexibility and/or to allow for lubrication such as by misting of oil and air within case (20). Preferably, plate (7) is attached to gear (7B).

In another aspect of a preferred transmission (14) of the present disclosure, angular holes (9) are incorporated into the helical gears (3), (4) and (5) in an angular fashion opposite to the helix angle to increase oil flow and assist in cooling through the movement of mist of oil and air on the inside of the gear case (20). Preferably an oil pump (11) is incorporated into the transmission to assist in oil flow, cooling, bearing longevity and gear life. The oil pump may be of mechanical, electrical fashion, or any combination or style thereof.

In a further aspect of a preferred transmission (14) of the present disclosure, separating the output shaft (6) and the input shaft (2) allows for lowering of the power source (13) and input shaft (2) in the airboat (25), thus achieving a lower center of gravity and a more balanced, better handling airboat (25).

In another aspect of a preferred transmission (14) of the present disclosure, idler gear (4), idler shaft (40) and idler bearings (17) are combined together as an assembly (10) that allows the idler gear (4), idler shaft (40) and idler bearings (17) to be mounted in the bell-shaped transmission housing (20) in variable positions, via pins, bolts and/or other fastening devices in holes (10A) to allow the same housing (20) of the complete transmission (14) to be used for multiple gear sets having varying ratios of reduction. Such construction will allow for reduced inventories of gear housings while increasing the number of reduction ratios a dealer can offer. Preferably for this embodiment, the bearings (17) for the idler gear (4) will be located inside idler gear (4) and not on the ends of the shaft (40) of idler gear (4).

In a further aspect of a preferred airboat of the present disclosure, input gear (3) will have a left hand rotation with a right hand helix angle as to not cause any undue forces/stresses on the input power source 13.

In another aspect of a preferred transmission (14) of the present disclosure, thrust caused by upper gear (5) will oppose thrust of output power produced by propeller (15).

In an additional aspect of a preferred transmission (14) of the present disclosure, each of the gears (3), (4) and (5) of will oppose forces caused by gears connected thereto throughout the system thereby neutralizing most of the thrust produced in the idler gear (4) with opposing thrust from the input gear (3) and output gear (5).

As shown in FIGS. 8-10, in a preferred embodiment of the transmission (14) of the present disclosure, the primary driver gear (3) and driven gear (5) are rotated counterclockwise while the idler gear (4) rotates clockwise. Such rotational scheme and the angles of helical gear teeth (3A), (4A) and (5A) produces outward (away from transmission (14) towards propeller (15)) thrust forces from the primary driver gear (3) and driven gear (5) and an inner thrust force from idler gear (4). As shown in FIGS. 9 and 13, the outward thrust force from driven top gear (5) opposes the inner thrust force from propeller (15).

It will be readily understood to those skilled in the art that various other changes in the details, components, material, and arrangements of the parts and methods which have been described and illustrated in order to explain the nature of this disclosure may be made without departing from the principles and scope of the disclosure as expressed in the subjoined claims.

In the foregoing description of preferred embodiments of the present disclosure, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the foregoing description, with each claim standing on its own as a separate embodiment.

What is claimed is:

1. A transmission (14) for connecting a propeller (15) to an engine (13) having a drive shaft (2), comprising:
   a first gear (3) driven by the drive shaft (2) in a first rotational direction;
   an idler gear (4) driven by the first gear;
   a third gear (5) driven by the idler gear (4); and
   an output shaft (6) driven by the third gear in the first rotational direction; and
   a torsion dampening plate (7) disposed on the drive shaft (2) within a housing (20) of the transmission (14), wherein the torsion dampening plate (7) dampens torque from the engine (13) and wherein the torsion dampening plate (7) defines a plurality of mounting openings (7C) and further comprises a plurality of bushings (8) to further assist in dampening any vibrations, shock loads, noises or stresses caused by torque from the engine (13).

2. The transmission (14) of claim 1, wherein the first gear (3), idler gear (4) and third gear (5) are helical gears.

3. The transmission (14) of claim 1, wherein respective helix angles of gear teeth (3A, 4A, 5A) on each of the first gear (3), idler gear (4) and third gear (5) operate when driven by the engine (13) and drive shaft (2) to produce thrust on the output shaft (6) that opposes thrust produced by the propeller (15) on the output shaft (6).

4. The transmission (14) of claim 1, wherein respective helix angles of gear teeth (3A, 4A, 5A) on each of the first gear (3), idler gear (4) and third gear (5) are right-handed or left-handed.

5. The transmission (14) of claim 1, wherein the transmission (14) uses a reverse helical gear configuration in a manner to help neutralize thrust produced by the propeller (15).

6. The transmission (14) of claim 1, wherein one or more of the first gear (3), idler gear (4) and third gear (5) define angular holes (9) in an angular fashion opposite to each respective angle of helix teeth (3A, 4A, 5A) to increase oil flow and assist in cooling through the movement of mist of oil and air on an inside the housing (20) for the transmission (14).

7. The transmission (14) of claim 1, further comprising an oil pump (11) to assist in oil flow within the housing (20) for the transmission (14), wherein the oil pump (11) is selected from the group consisting of a mechanical pump, an electrical pump, or any combination thereof.

8. The transmission of claim 1, wherein the thrust produced in the idler gear (4) is opposed by thrust from the first gear (3) and the third gear (5).

9. A transmission (14) for connecting a propeller (15) to an engine (13) having a drive shaft (2), comprising:
- a first gear (3) driven by the drive shaft (2) in a first rotational direction;
- an idler gear (4) driven by the first gear;
- a third gear (5) driven by the idler gear (4); and
- an output shaft (6) driven by the third gear in the first rotational direction; and
- a carrier assembly (10) that allows the idler gear (4), an idler shaft (40) and idler bearings (17) to be mounted in variable positions, via fasteners and holes (10A), in a transmission housing (20) for the transmission (14) to allow the transmission housing (20) to be used for multiple gear sets having varying ratios of reduction.

\* \* \* \* \*